US012399797B2

(12) United States Patent
Rothschild et al.

(10) Patent No.: US 12,399,797 B2
(45) Date of Patent: Aug. 26, 2025

(54) APPROXIMATING ENERGY USE OF SOFTWARE EXECUTING ON VIRTUAL MACHINES

(71) Applicant: Dell Products, L.P., Round Rock, TX (US)

(72) Inventors: Seth Rothschild, Littleton, MA (US); Rana Afifi, New Cairo (EG); Andrew Veitch, Weston, MA (US); Amy N. Seibel, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 18/331,156

(22) Filed: Jun. 7, 2023

(65) Prior Publication Data
US 2024/0411654 A1    Dec. 12, 2024

(51) Int. Cl.
*G06F 11/30* (2006.01)
*G06F 1/32* (2019.01)
*G06F 1/3206* (2019.01)

(52) U.S. Cl.
CPC ........ *G06F 11/3062* (2013.01); *G06F 1/3206* (2013.01)

(58) Field of Classification Search
CPC ............................ G06F 11/3062; G06F 1/3206
See application file for complete search history.

(56) References Cited

U.S. PATENT DOCUMENTS

| 10,789,085 B2 * | 9/2020 | Jang ...................... G06F 9/5027 |
| 2014/0149779 A1 * | 5/2014 | Allen-Ware ........ G06F 11/3013 713/340 |
| 2016/0224094 A1 * | 8/2016 | Klein .................... G06F 1/3234 |

OTHER PUBLICATIONS

"Containerization vs. Virtualization : understand the differences" Ubuntu. [https://ubuntu.com/blog/containerization-vs-virtualization#:~: text=By sharing the host kernel, resources without compromising on performance] retrieved May 4, 2023, 7 pages.
"Green Software" Github. [https://github.com/Green-Software-Foundation/awesome-green-software] retrieved Oct. 4, 2024, 11 pages.
"FreeIPMI" GNU. [https://www.gnu.org/software/freeipmi/] retrieved Oct. 4, 2024, 3 pages.
(Continued)

*Primary Examiner* — Stefan Stoynov
(74) *Attorney, Agent, or Firm* — Amin, Turocy & Watson, LLP

(57) ABSTRACT

Approximating energy use of software executing on virtual machines is presented herein. A system determines a pair of energy consumption baselines of a host computing device representing respective energy being utilized by the host computing device; determines, at a sampling time within a job execution period during which a job has been executing on a virtual machine (VM) of the host computing device, an energy consumption of the host computing device; and based on the pair of energy consumption baselines and the energy consumption of the host computing device, and further based on respective estimated portions of processing resources of a central processing unit of the host computing device being utilized, at the sampling time, by the VM and by the job within the VM, determines an approximate amount of energy use of the job that has executed on the VM.

20 Claims, 10 Drawing Sheets

(56) References Cited

OTHER PUBLICATIONS

"PowerAPI" [http://powerapi.org/] retrieved Oct. 4, 2024, 3 pages.
"Dell Technologies Global Climate Principles" [https://i.dell.com/sites/doccontent/corporate/corp-comm/en/Documents/dellclimatepolicyprinciples.pdf] Apr. 2021, 10 pages.
"ipmitool" Github. [https://github.com/ipmitool/ipmitool] retreived Apr. 27, 2025, 10 pages.

* cited by examiner

APPROXIMATING ENERGY USE OF SOFTWARE EXECUTING ON VIRTUAL MACHINES

TECHNICAL FIELD

The subject disclosure generally relates to embodiments for approximating energy use of software executing on virtual machines (VMs).

BACKGROUND

A computer, e.g., a computer processing unit (CPU), uses electricity to execute software, and it is desirable to determine energy consumption of such software.

BRIEF DESCRIPTION OF THE DRAWINGS

Non-limiting embodiments of the subject disclosure are described with reference to the following Figures, in which like reference numerals refer to like parts throughout the various views unless otherwise specified.

DETAILED DESCRIPTION

Figure 1:
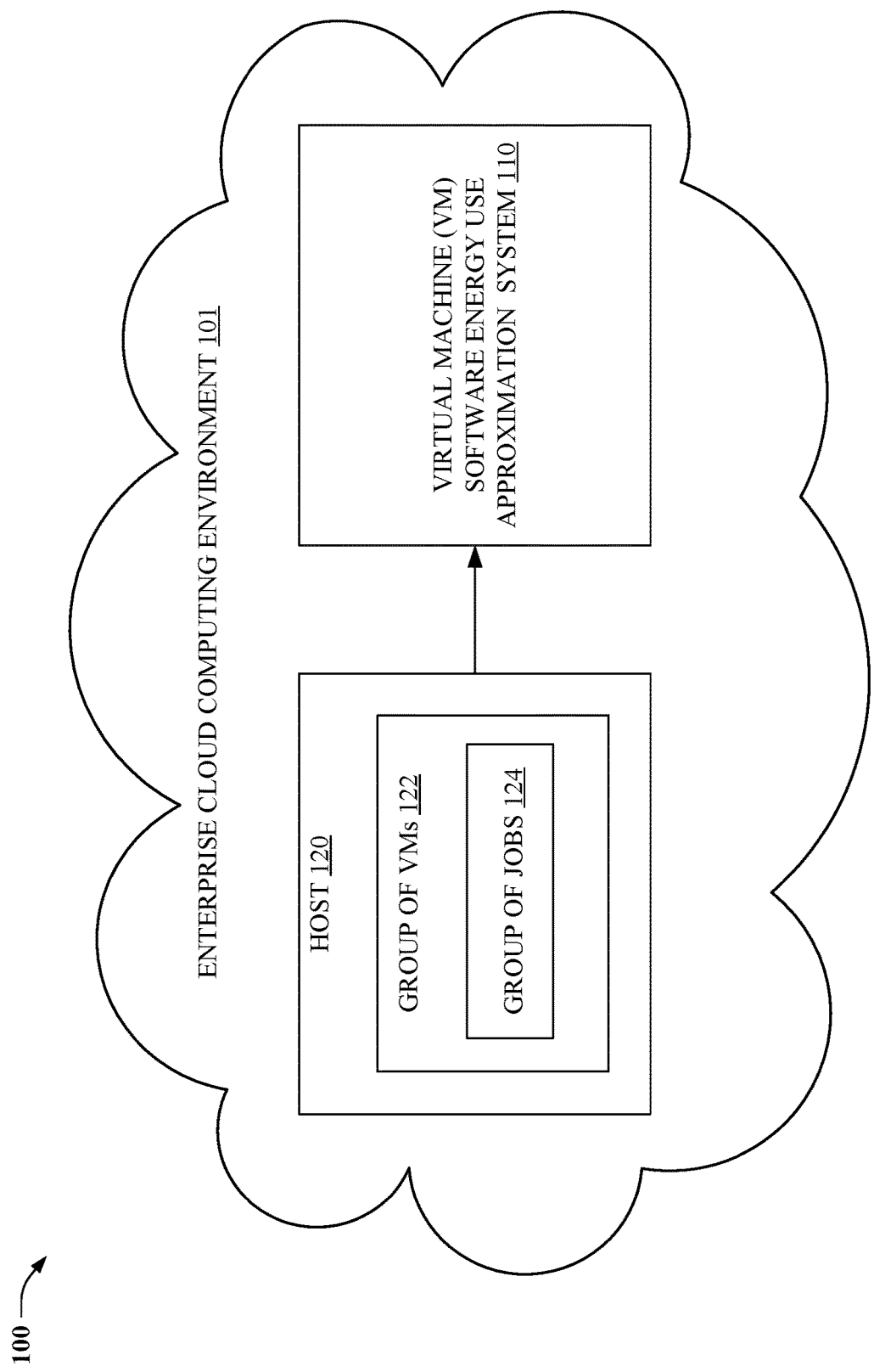
FIG. 1 illustrates a block diagram of an enterprise cloud computing environment including a virtual machine (VM) software energy use approximation system, in accordance with various example embodiments.
Figure 2:
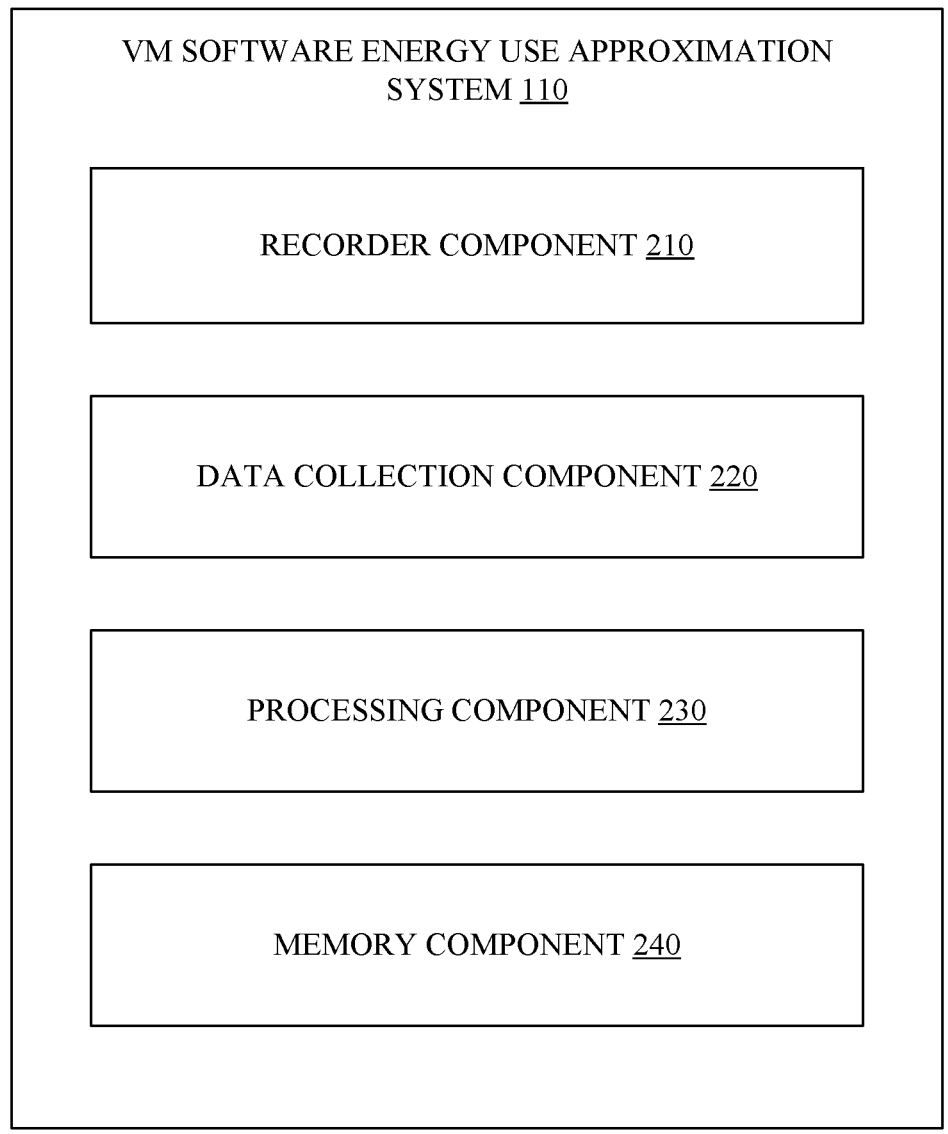
FIG. 2 illustrates a block diagram of a VM software energy use approximation system that determines approximate amounts of energy use of respective jobs executing on virtual machines of a host, in accordance with various example embodiments.
Figure 3:
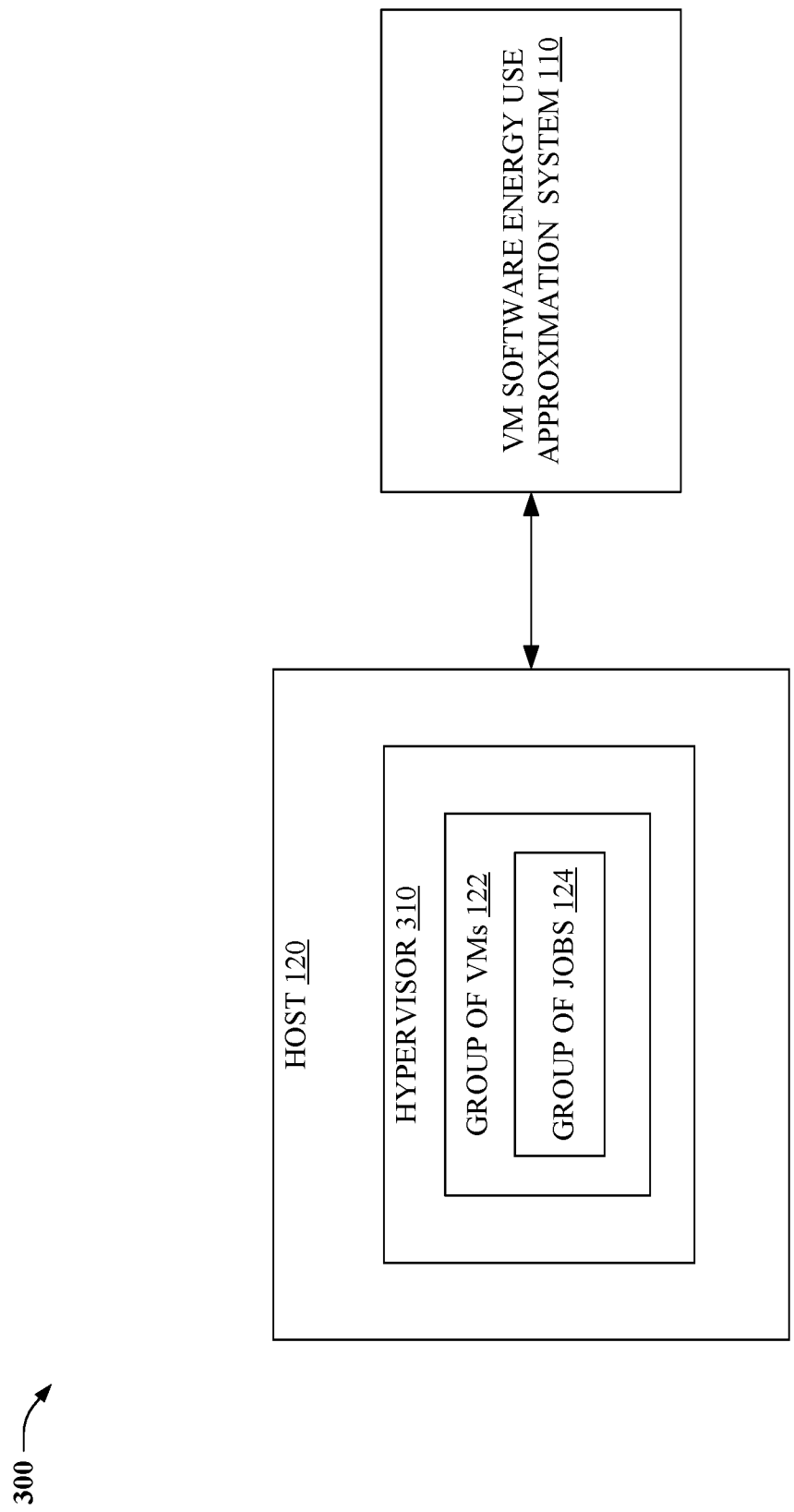
FIG. 3 illustrates a block diagram of a VM software energy use approximation system that determines approximate amounts of energy use of respective jobs executing on virtual machines of a hypervisor executing on a host, in accordance with various example embodiments.
Figure 4:
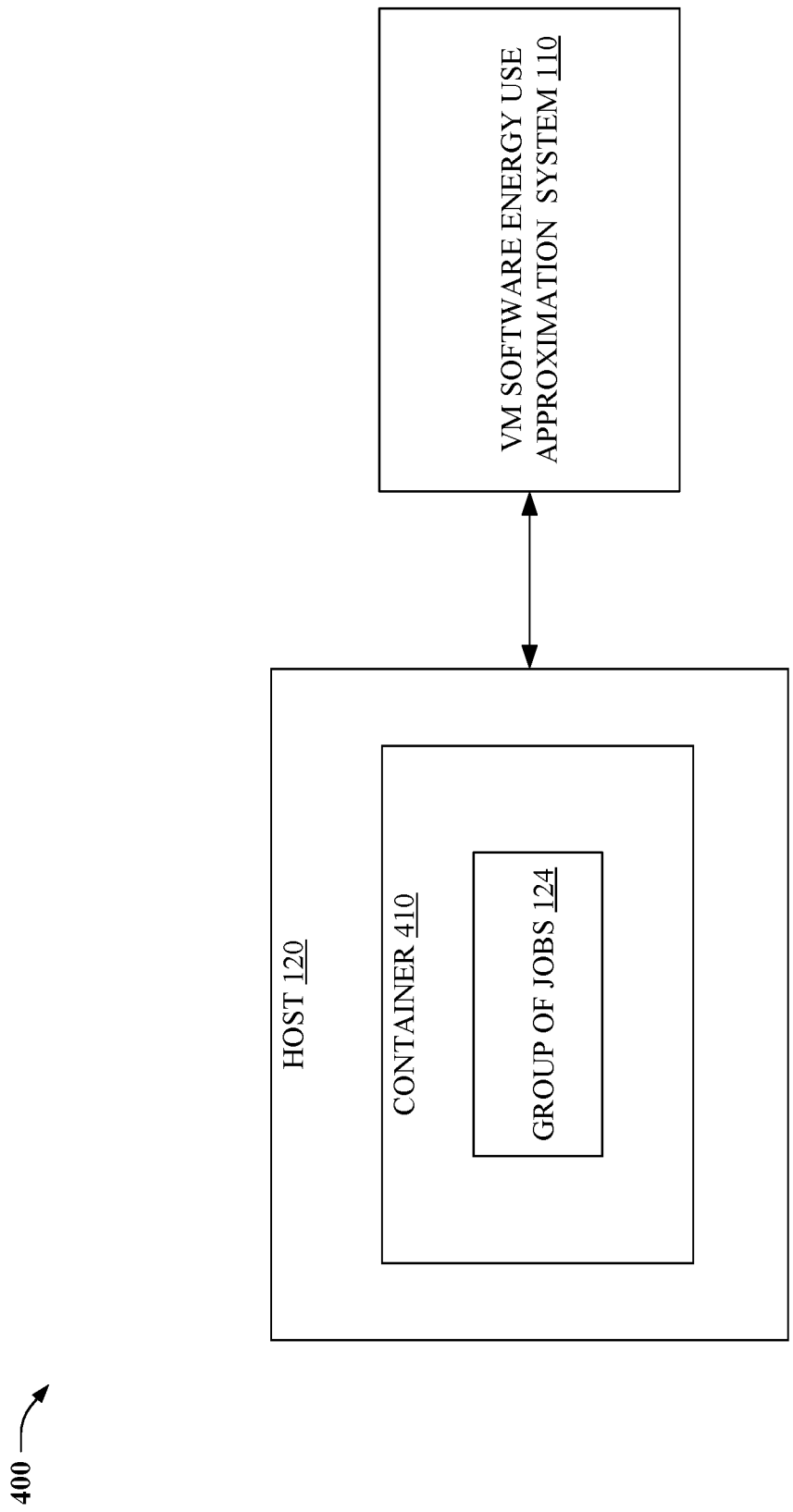
FIG. 4 illustrates a block diagram of a VM software energy use approximation system that determines approximate amounts of energy use of respective jobs executing on a container this is executing on a host, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Computers use electricity to run software. Running different software uses different amounts of electricity. While conventional computing technologies can determine how much energy a particular CPU is using for a program that is being executed on an operating system (OS) that is not implementing a virtualized and/or emulated physical computing resource, such computing technologies cannot effectively measure energy consumption of jobs running within a VM and/or a hypervisor, e.g., reporting power consumption of particular VMs that far exceed maximum operating power constraints of a corresponding CPU. Consequently, conventional computing technologies have had some drawbacks, some of which may be noted with reference to the various embodiments described herein below.

In various embodiments described herein, a VM software energy use approximation system determines an approximate amount of energy use of a job that has executed on a VM, and/or a hypervisor, over a period, by comparing energy consumption of a host (e.g., physical computing device) during the period with a pair of determined baselines for energy consumption of the host outside of the period.

For example, in embodiment(s), a system, e.g., a VM software energy use approximation system, performs operations comprising: determining a pair of energy consumption baselines of a host computing device representing respective energy being utilized by the host computing device; determining, at a sampling time within a job execution period during which a job has been executing on a VM of the host computing device, an energy consumption of the host computing device; and based on the pair of energy consumption baselines and the energy consumption of the host computing device, and further based on respective estimated portions of processing resources of a CPU of the host computing device being utilized, at the sampling time, by the VM and by the job within the VM, determining an approximate amount of energy use of the job that has executed on the VM.

In an embodiment, the determining of the pair of energy consumption baselines comprises: based on a defined period, determining a group of energy consumption values of the host computing device; selecting, as a first energy consumption baseline of the pair of energy consumption baselines, a first energy consumption value of the group of energy consumption values; and selecting, as a second energy consumption baseline of the pair of energy consumption baselines, a second energy consumption value of the group of energy consumption values, in which the first energy consumption baseline is less than the second energy consumption baseline.

In one embodiment, the first energy consumption value has been selected as the lowest energy consumption value of the group of energy consumption values.

In another embodiment, the first energy consumption value has been selected as an average energy consumption value of the group of energy consumption values.

In yet another embodiment, the second energy consumption value has been selected as the highest energy consumption value of the group of energy consumption values.

In an embodiment, the second energy consumption value has been selected as being among a defined percentage of energy consumption values of the group of energy consumption values.

In one embodiment, the operations further comprise: based on a start time of the job representing a first time that the job has been initiated, and further based on an end time of the job representing a second time that the job has been completed, determining the job execution period.

In another embodiment, the job is represented by a function, in which a function wrapper is implemented within the function, and the determining of the job execution period comprises: determining, via the function wrapper, the start time of the job; and determining, via the function wrapper, the end time of the job, in which the job execution period is equal to the start time subtracted from the end time.

In yet another embodiment, the determining of the start time comprises obtaining the start time via a first hypertext transfer protocol (HTTP) post request or a first HTTP secure (HTTPS) request, and the determining of the end time comprises obtaining the end time via a second HTTP post request or a second HTTPS request.

In an embodiment, the determining of the approximate amount of energy use of the job that has executed on the VM comprises: based on the energy consumption of the host computing device, and further based on a first energy consumption baseline of the pair of energy consumption baselines, determining an upper bound value of the approximate amount of energy use of the job; and based on the energy consumption of the host computing device, and further based on a second energy consumption baseline of the pair of energy consumption baselines, determining a lower bound value of the approximate amount of energy use of the job, in which the upper bound value is greater than the lower bound value.

In one embodiment, the operations further comprise: in response to the upper bound value being determined to satisfy a defined power condition representing that the job has been determined to be using more power than has been allocated to the job, outputting a message indicating that the job has been using more power than has been allocated to the job.

In an embodiment, the operations further comprise: in response to the upper bound value being determined to satisfy a defined power condition representing that the job has been determined to be using an amount of power that is approaching. e.g., within 10% of, the upper bound, outputting a message indicating that the job has been using an amount of power that is within 10% of the upper bound.

In one embodiment, the operations further comprise: in response to the upper bound value being determined to satisfy a defined power condition representing that the job has been determined to be using an amount of power that is substantially less, e.g., 80% less, than an expected defined amount of power that has been allocated, e.g., via a defined power budget, to the job, outputting a message indicating that the job has been using substantially less power than has been allocated to the job.

In another embodiment, the host computing device comprises a hypervisor that executes a group of virtual machines comprising the VM, and the operations further comprise: determining, via the hypervisor, a group of respective estimated proportions of processing resources of the CPU of the host computing device being utilized, at the sampling time, by each VM of the group of virtual machines, in which the group of respective estimated proportions of processing resources of the CPU comprises the respective estimated portions of the CPU.

In yet another embodiment, the group of respective estimated portions of processing resources of the CPU of the host computing device being utilized by each VM is a first group, in which the group of virtual machines execute respective jobs comprising the job, and in which the operations further comprise: determining, via an operating system of the host computing device, a second group of respective estimated proportions of processing resources of the CPU of the host computing device being utilized, at the sampling time, by each job of the respective jobs.

In an embodiment, the determining of the approximate amount of energy use of the job that has executed on the VM comprises: based on the first group of respective estimated portions of processing resources of the CPU being utilized, at the sampling time, by each VM, and further based on the second group of respective estimated portions of processing resources of the CPU being utilized, at the sampling time, by each job, determining the approximate amount of energy use of the job.

In one embodiment, a method, comprises: determining, by a system, e.g., a VM software energy use approximation system, comprising a processor, a lower baseline for power usage of a physical computing device and an upper baseline for power usage of the physical computing device, in which the lower baseline is less than the upper baseline; during respective defined sampling periods, determining, by the system at respective sampling times, respective power usages of the physical computing device, determining, by the system at the respective sampling times, first respective percentages of processing resources of a central processing unit (CPU) of the physical computing device being utilized by a group of virtual machines being executed on the physical computing device, and determining, by the system at the respective sampling times, second respective percentages of processing resources of the CPU being utilized by a group of jobs being executed on the group of virtual machines; and based on the lower baseline and the upper baseline, the respective power usages of the physical computing device, the first respective percentages of processing resources of the CPU being utilized by the group of virtual machines, and the second respective percentages of processing resources of the CPU being utilized by the group of respective jobs, determining, by the system, lower power usage baselines for the respective jobs and higher power usage baselines for the respective jobs, in which a lower power usage baseline of the lower power usage baselines for a job of the group of respective jobs is less than a higher power usage baseline of the higher power usage baselines for the job.

In another embodiment, the determining of the lower baseline for the power usage of the physical computing device comprises: selecting, as the lower baseline from a group of determined power usage values of the physical computing device that have been obtained over a defined period, a determined power usage value that is lower than remaining determined power usage values of the group of determined power usage values or that is an average of the determined power usage values.

In yet another embodiment, the determining of the upper baseline for the power usage of the physical computing device comprises: selecting, as the upper baseline from a group of determined power usage values of the physical computing device that have been obtained over a defined period, a determined power usage value that is higher than remaining determined power usage values of the group of determined power usage values or that is among a defined percentage of determined power usage values of the group of determined power usage values.

In an embodiment, the method further comprises: in response to obtaining, via respective HTTP post requests or respective HTTPS requests, respective start times of the respective jobs and respective end times of the respective jobs, determining, by the system, the respective defined sampling periods.

In one embodiment, a non-transitory machine-readable medium comprises instructions that, in response to execution, cause a system, e.g., a VM software energy use approximation system, comprising a processor to perform operations, the operations comprising: determining a pair of energy consumption baselines of a host computing device representing respective energy being utilized by the host computing device, wherein a first energy consumption baseline of the pair of energy consumption baselines is less than a second energy consumption baseline of the pair of energy consumption baselines; determining a job execution period during which a job has executed on a virtual machine (VM) of the host computing device; based on a defined time within the job execution period, determining an energy consumption of the host computing device, determining a first percentage of processing resources of a CPU of the host computing device being utilized by the VM, and determining a second percentage of the processing resources of the CPU being utilized by the job within the VM; and based on the pair of energy consumption baselines of the host computing device, the energy consumption of the host computing device, the first percentage of processing resources of the CPU being utilized by the VM, and the second percentage of the processing resources of the CPU being utilized by the job within the VM, determining an approximate amount of energy use of the job that has executed on the VM.

In another embodiment, the operations further comprise: in response to determining that the approximate amount of energy use of the job satisfies a defined condition representing that the approximate amount of energy use of the job is greater than a defined maximum amount of energy use that has been allocated to the job, sending, via a user interface of the system, information indicating that the job has been using more energy that has been allocated to the job.

In yet another embodiment, the operations further comprise: in response to determining that the approximate amount of energy use of the job satisfies a defined condition representing that the approximate energy use of the job has approached, within a defined amount of energy use (e.g., within 10%) of a maximum amount of energy use that has been allocated to the job, sending, via a user interface of the system, information indicating that the job has been using an amount of energy approaching a maximum amount of energy that has been allocated to the job.

In an embodiment, the operations further comprise: in response to determining that the approximate amount of energy use of the job satisfies a defined condition representing that the approximate energy use of the job is substantially less, e.g., 80% less, than an expected defined power that has been allocated, e.g., via a defined power budget, to the job, sending, via a user interface, a message indicating that the job has been using substantially less power than has been allocated to the job.

As described above, conventional computing technologies cannot accurately measure energy consumption of jobs running within a VM and/or a hypervisor. In various embodiments described herein, and now referring to FIGS. 1-4, a VM software energy use approximation system (110), e.g., of an enterprise cloud computing environment (101), determines an approximate amount of energy use of a job that has executed, over a period, on a VM and/or a hypervisor by comparing energy consumption of a host (120) (e.g., physical computing device) during the period with a pair of determined baselines for energy consumption of the host outside of the period.

The VM software energy use approximation system includes a recorder component (210), a data collection component (220), a processing component (230), and a memory component (240). In embodiment(s), the memory component stores executable instructions that, when executed by the processing component, facilitate performance of operations by the VM software energy use approximation system. For example, such operations include determining a pair of energy consumption baselines of a host computing device (e.g., host 120) representing respective energy being utilized by the host computing device; determining, at a sampling time within a job execution period during which a job (e.g., of group of jobs 124) has been executing on a virtual machine VM (e.g., of a group of VMs 122) of the host computing device, an energy consumption of the host computing device; and based on the pair of energy consumption baselines and the energy consumption of the host computing device, and further based on respective estimated portions of processing resources of a CPU of the host computing device being utilized, at the sampling time, by the VM and by the job within the VM, determining an approximate amount of energy use of the job that has executed on the VM.

In this regard, in embodiment(s), the recorder component comprises a wrapper that can be applied to user supplied functions/programs. The data collection component can obtain data from an OS, a hypervisor, and/or a VM OS (e.g., container (e.g., 410)), and can obtain host data from the host. In turn, as described below, the VM software energy use approximation system can determine an approximate power consumption of a job, e.g., the user supplied functions/programs, based on the data obtained from the OS, the hypervisor, and the VM OS.

In an embodiment, the recorder component can be implemented in Python, in which an "@recorder" decorator can be written above a function to wrap the function inside of the recorder component to facilitate execution of operations performed by the recorder component described herein. In other embodiment(s), function(s) written in other programming language(s) can be annotated to facilitate the execution of operations performed by the recorder component.

In yet other embodiment(s), the recorder component is communicatively coupled with the data collection component, e.g., using HTTP POST request(s), HTTPS request(s), or other types of data-based messages, to indicate to the data collection component that a job (e.g., of group of jobs 124) is starting (so that a timestamp can be marked via the data collection component). Further, the data-based messages (e.g., HTTP POST request(s), HTTPS request(s)) can comprise extra metadata such as a job name of the job, a VM name of the VM, a developer supplied description of the job, and/or a local timestamp.

In embodiment(s), in response to receiving a data-based message (e.g., HTTP POST request/HTTPS request, the host can return a job id that is a unique identifier for the job.

In other embodiment(s), the host can further initiate and execute side process(es) that document, via host data, local resource use (e.g., representing CPU usage of the job), and can record the host data locally in a storage medium communicatively coupled to the host. In turn, the recorder component can obtain the host data from the host, e.g., via HTTP POST/HTTPS request(s).

To account for a minor impact of execution of the side process(es) on measurement(s) of power consumption for the job, extra energy consumption of the side process(es) could be accounted for by performing power measurement(s) without the job being executed via the CPU, and subtracting such measurement(s) from other CPU measurements made during execution of the job.

Further, e.g., in response to obtaining the job id from the host, the recorder component runs (or executes) the job, e.g., with the internal function decorated by @recorder, as normal. In turn, in response to the internal function finishing (e.g., being executed), the recorder component can communicate, e.g., via an HTTP POST/HTTPS request, with the data collection component to indicate that the job has ended. If additional OS data was recorded by the host via the side process(es) described above, the recorder component can obtain such data, and communicate, e.g., via an HTTP POST/HTTPS request(s), the additional OS data to the data collection component.

In embodiment(s), the data collection component comprises a web server that accepts HTTP connections. In other embodiment(s), the data collection component sends and/or receives data to/from the recorder component via data packets, messages, or other forms of data communication. In yet other embodiment(s), the data collection server stores information received from the recorder component, e.g., representing start and stop (or completion) times of a job.

In other embodiment(s), the data collection component can obtain, from the host, information representing power use of the host at a given time, e.g., by periodically querying the host based on a defined period, e.g., 10 seconds, and determining power consumption of the host, e.g., log of power use of the host, at that point in time.

In yet other embodiment(s), the data collection component can obtain, from a hypervisor (e.g., 310) (e.g., a virtual machine monitor (VMM) that is a process being executed on a host that creates and runs VMs), information representing CPU power being consumed by respective VMs of a group of VMs (122) being executed via the host.

In various embodiment(s), the VM software energy use approximation system can determine approximate power consumptions of respective jobs (e.g., of group of jobs 124) based on the data obtained from the OS, the hypervisor, and the VM OS.

In this regard, two power recording baselines $M_1$ and $M_2$ for a host where the job is running and where $M_1 < M_2$. As an example, $M_1$ might be the lowest power reading, or the average of all power readings in the last 24 hours, while $M_2$ might be a higher number that still shows up in 10% of all power readings. The baselines represent energy being used by the host which is not created by the job. When we subtract $M_1$, we'll get a larger estimate for how much energy the job actually used, and when we subtract $M_2$, our result will be a smaller estimate for how much energy the job actually used.

In an embodiment, in response to determining CPU power usage via a hypervisor (e.g., 310) of the host, the VM software energy use approximation system can determine, at every power reading at time t, respective proportions of CPU each VM of a group of VMs (e.g., 122) is using. For example, in response to a determination that a first VM v of the group of VMs on the host is using 25% of the CPU at time t, the VM software energy use approximation system sets $c_{vt}=0.25$.

In another embodiment, in response to determining CPU power usage via an OS of the host, the VM software energy use approximation system can determine, for every job of a group of jobs running at time t, respective proportions of (e.g., virtual) CPU the OS executing a VM v estimates a job j of the group of jobs is using. For example, in response to determining that the job j has been recorded on the first VM to be using 95% of the available CPU, then set $a_{vjt}=0.95$.

To determine the energy contribution from one job, the VM software energy use approximation system establishes a lower bound and an upper bound for a power estimate of the job using two baselines by defining two functions:

$$w_{upper}(j, t) = a_{vjt} c_{vt}(\max (p_t - M_1, 0))$$

and $$w_{lower}(j, t) = a_{vjt} c_{vt}(\max (p_t - M_2, 0)),$$

in which $p_t$ is the power reading of the host at time t, $a_{vyt}$ is the proportion of the CPU used by job j on VM v at time t, and $c_{vt}$ is the relative CPU consumption of VM v at time t.

In embodiment(s), based on the two functions defined above, the VM software energy use approximation system determines approximate energy consumption of a job j by summing over all times when the job is running. For example, utilizing a trapezoid rule, the VM software energy use approximation system determines a first baseline, e.g., or upper bound, representing a higher approximation for energy consumption of the job j as:

$$p_{upper}(j) = (t_{i+1} - t_i)(W_{upper}(j, t_{i+1}) + W_{upper}(j, t_i))/2.$$

Further, utilizing the trapezoid rule, the VM software energy use approximation system determines a second baseline, e.g., or lower bound, representing a lower approximation for energy consumption of the job j as:

$$p_{lower}(j) = (t_{i+1} - t_i)(W_{lower}(j, t_{i+1}) + W_{lower}(j, t_i))/2.$$

The following describes an example of energy estimation performed by the VM software energy use approximation system, in which 4 jobs are running on 2 virtual machines running on one host (e.g. 120):

seth_job is run from 12:00-1:00 on seth_vm and is being recorded by the recorder component (the @wrapper function has been applied);

rana_job is run from 12:30-1:30 on seth_vm and is being recorded by the recorder component (the @wrapper function has been applied);

amy_job is run from 12:30-1:30 on seth_vm and is not being recorded by the recorder component (Amy has not used an @wrapper function); and andy_job is run from 12:00-1:00 on andy_vm and is not being recorded by the recorder component (Andy has also not used an @wrapper function).

The VM software energy use approximation system tracks energy usage on the host over time. The lowest reading that the VM software energy use approximation system has determined in the last 24 hours is 300 W on the host, but has also determined that energy consumption moved up to 320 W for hours at a time (e.g., because Amy and Andy were secretly running jobs in the past 24 hours that weren't being recorded via the VM software energy use approximation system), the VM software energy use approximation system uses 300 W and 320 W as baselines.

When the jobs run, the VM software energy use approximation system determines the following corresponding to the period from 12:00-12:30:
- seth_job starts at 12:00;
- energy readings performed during the period represent power used by the host is 320 W;
- CPU usage of seth_vm is 20% and seth_job is using that entire 20% (e.g., seth_job accounts for 100% of the CPU usage on seth_vm), in which such information is accessible from within the VM OS (e.g. via Linux file /proc/<PID>/stat); and
- seth_vm is using 1% of the host CPU and andy_vm is using 1% of the host CPU. Taking only the current relative use of VMs into account, the VM software energy use approximation system determines that seth_vm accounts for 50% of the CPU usage on the host and andy_vm accounts for 50% of CPU usage on the host.

It should be appreciated that in response to a determination that other long-running process(es) are using the CPU, e.g., the hypervisor itself using the CPU), the VM software energy use approximation system includes such utilization in the baselines.

When the jobs run, the VM software energy use approximation system determines the following corresponding to the period from 12:30-1:00:
- rana_job starts at 12:30;
- energy readings performed during the period represent power used by the host is 340 W;
- CPU usage of seth_vm is 60% and seth_job is using 20%, rana_job is using 20%, and other processes are using 20%. In other words, seth_job accounts for 33% of the CPU usage on seth_vm and rana_job accounts for 33% of the CPU usage on seth_vm; and
- seth_vm is using 3% of the host CPU and andy_vm is using 1% of the host CPU. In other words seth_vm accounts for 75% of the CPU usage on the host and andy_vm accounts for 25% of CPU usage on the host.

When the jobs run, the VM software energy use approximation system determines the following corresponding to the period from 1:00-1:30:
- seth_job ends at 1:00;
- energy readings performed during the period represent power used by the host is 320 W;
- CPU usage of seth_vm is 40% and rana_job is using only 20%. In other words, rana_job accounts for 50% of the CPU on seth_vm;
- seth_vm is using 2% of the host CPU and andy_vm is using 0%. In other words, seth_vm accounts for 100% of the CPU usage on the host; and
- rana_job ends at 1:30.

Based on the above information, the VM software energy use approximation system determines the following for the period from 12:00-12:30:
- only one job (seth_job) is running; and
- an upper bound of energy consumption during this period is 20 W (320 W-300 W), and a lower bound of energy consumption during this period is 0 W (320 W-320 W). Further, the VM software energy use approximation system scales the upper and lower bounds of energy consumption by multiplying by 1 (for the CPU consumption on seth_vm) and multiplying by 0.5 (because the VM is only accounting for 50% of energy on the host). In turn, the VM software energy use approximation system estimates that seth_job is using between 0 W and 10 W from 12:00-12:30.

Based on the above information, the VM software energy use approximation system determines the following for the period from 12:30-1:00:
- only two jobs (seth_job and rana_job) are running from 12:30-1:00, so the VM software energy use approximation system performs the same calculation for each of these jobs; and
- an upper bound of energy consumption during this period is 40 W (340 W-300 W), and a lower bound of energy consumption during this period is 20 W (340 W-320 W). Further, the VM software energy use approximation system scaling seth_job and rana_job by 0.33 and 0.75. In turn, the VM software energy use approximation system estimates that each job (seth_job and rana_job) is bounded between 1.66 W and 10 W.

Based on the above information, the VM software energy use approximation system determines the following for the period from 1:00-1:30:
- only one job (rana_job) is running. Accordingly, the VM software energy use approximation system multiplies rana_job by 1 (for 100% of CPU usage on the host) and by 0.5 (for 50% CPU usage within seth_vm). Accordingly, the VM software energy use approximation system estimates that rana_job is bounded between 0 W and 10 W.

In summary: $M_1=300$; $M_2=320$; $c_{v,t}$ changed over time (for seth_vm, it went from 0.5 to 0.75 to 1; and ay, also changed over time (for seth_job it went from 0.5 to 0.33, and for rana_job it went from 0.33 to 0.5.

Figure 5:
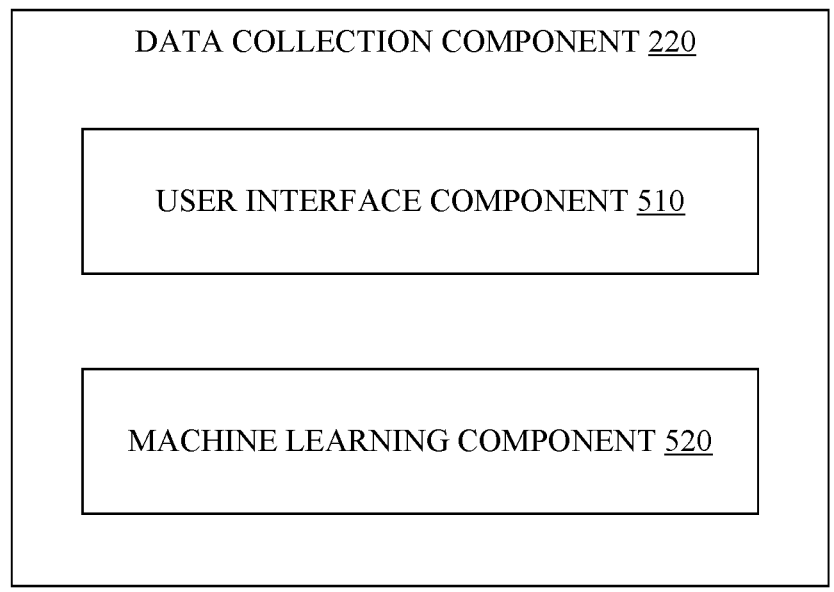
FIG. 5 illustrates a block diagram of a data collection component of a VM software energy use approximation system, in accordance with various example embodiments.

In embodiment(s) illustrated by FIG. 5, the data collection component comprises a user interface component (510) and a machine learning component (520). In this regard, in response to the upper bound value of the approximate amount of energy use of the job being determined, by the VM software energy use approximation system, to satisfy a defined power condition representing that the job has been determined to be using more power than has been allocated to the job, the VM software energy use approximation system outputs, via the user interface component, a message indicating that the job has been using more power than has been allocated to the job.

In other embodiment(s), in response to the upper bound value being determined to satisfy a defined power condition representing that the job has been determined to be using an amount of power that is approaching, e.g., within a defined percentage (e.g., 10%) of, the upper bound, the VM software energy use approximation system outputs, via the user interface component, a message indicating that the job has been using an amount of power that is approaching, e.g., within the defined percentage of, the upper bound.

In yet other embodiment(s), in response to the upper bound value being determined to satisfy a defined power condition representing that the job has been determined to be using an amount of power that is substantially less, e.g., 80% less, than an expected defined power that has been allocated. e.g., via a defined power budget, to the job, the VM software energy use approximation system outputs, via the user interface component, a message indicating that the job has been using substantially less power than has been allocated to the job.

In embodiment(s), the VM software energy use approximation system, e.g., utilizing the machine learning component, can determine which user supplied functions/programs satisfy a defined criteria with respect to a defined power consumption of a job, e.g., the VM software energy use approximation system can determine, based on the data described above that has been obtained from the OS, the hypervisor, and the VMOs, which user supplied functions/ programs utilize more power than a defined user supplied function/program threshold corresponding to the job.

In turn, the VM software energy use approximation system can output (e.g., via the user interface component, via an email, via a post to a webhook API, or via another messaging process) the job and/or the user supplied function/program that satisfies the defined criteria with respect to the power consumption of the job, e.g., which user supplied functions/programs utilize more power than a defined user supplied function/program threshold corresponding to the job.

In other embodiment(s), the VM software energy use approximation system, e.g., utilizing the machine learning component, can determine energy performance of external libraries by implementing, as described above, respective function wrappers within functions of the external libraries. In turn, the VM software energy use approximation system can output, e.g., via the user interface component, information that identifies a suspect external library of the external libraries that is utilizing more energy than a defined library energy consumption threshold.

In yet other embodiment(s), the VM software energy use approximation system can output, e.g., via the user interface component, information that recommends that the job be executed on different hardware, e.g., hardware that has been determined to meet energy consumption requirements of the job.

Defined classifiers utilized via the machine learning component, can be stored, e.g., in a data store (not shown) communicatively coupled to the VM software energy use approximation system, and can represent respective defined conditions described herein with respect to power consumption of jobs, functions, external libraries, and/or user supplied functions/libraries.

It should be appreciated that various embodiments described herein with respect to operations performed via the VM software energy component can be performed with and/or without the machine learning component.

In embodiment(s), classifier(s), e.g., the defined classifiers, are explicitly trained, e.g., via generic training data, as well as implicitly trained, e.g., based on job data. For example, support vector machines can be configured via a learning or training phase within a classifier constructor and feature selection module, or other component (all not shown) of the machine learning component. Thus, the classifier(s) can be used by the machine learning component to automatically learn and perform a number of functions, e.g., performed by a system (e.g., 110), including but not limited to, determining an approximate amount of energy use of a job that has executed on a VM and/or a hypervisor over a period; determining that a job has been using more power than has been allocated to the job; determining that a job has been using an amount of power that is approaching an upper bound; and/or determining that a job has been using an amount of power that is substantially less than an expected defined amount of power that has been allocated to the job.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that is desired to be automatically performed, e.g., with respect determining an approximate amount of energy use of a job that has executed on a VM and/or a hypervisor over a period; determining that a job has been using more power than has been allocated to the job; determining that a job has been using an amount of power that is approaching an upper bound; and/or determining that a job has been using an amount of power that is substantially less than an expected defined amount of power that has been allocated to the job.

A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user (or subscriber) data, function data, device data, application data, implicit data, and/or explicit data. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes, machine learning models, and/or systems (e.g., a decision tree based learning model, a linear regression based learning model, support vector machines, neural networks, expert systems, Bayesian belief networks, fuzzy logic, and data fusion engines) can be employed in connection with performing automatic and/or inferred action in connection with the disclosed subject matter.

FIGS. 6-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
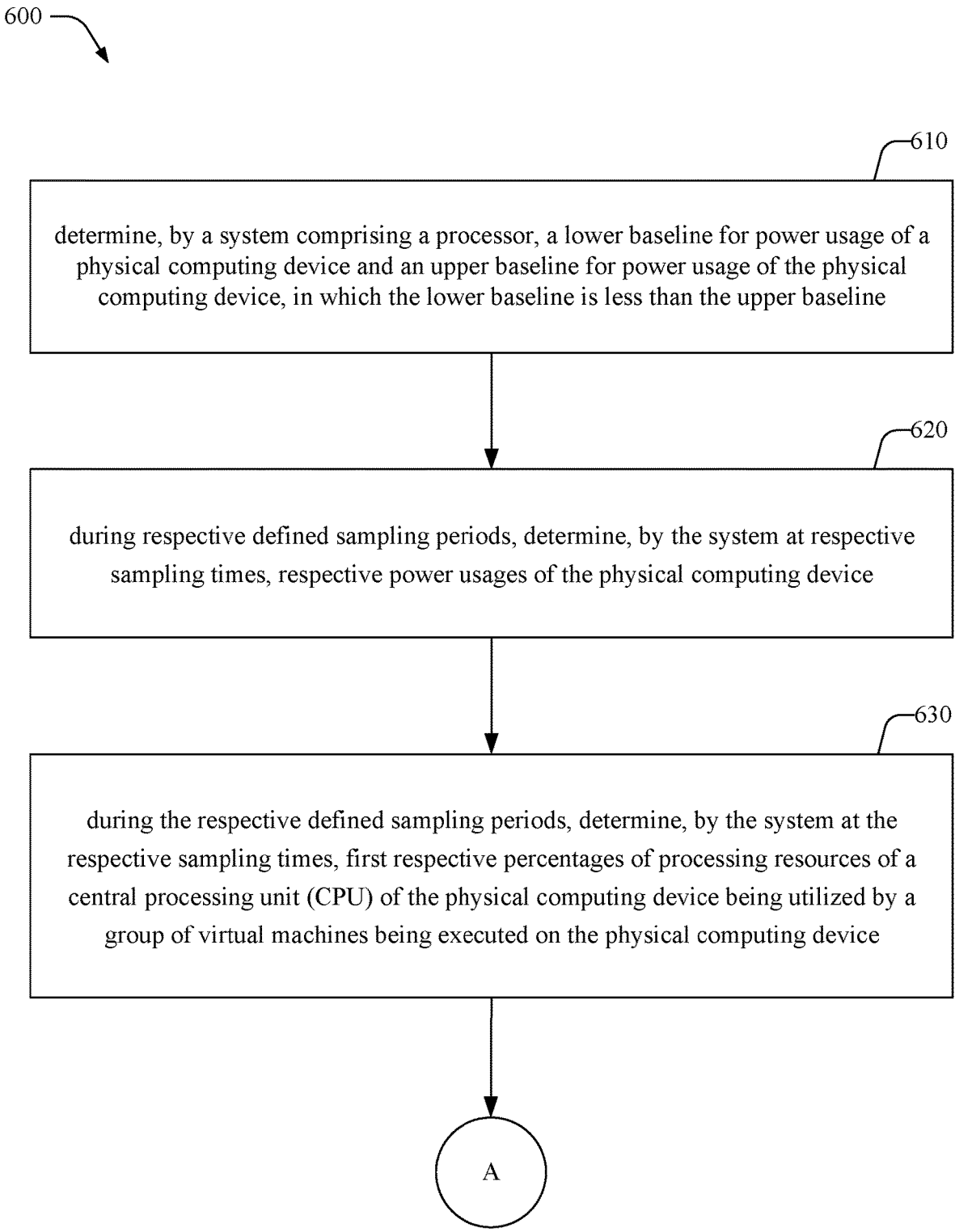
FIGS. 6-7 illustrate flow charts of a method associated with a VM software energy use approximation system, in accordance with various example embodiments.
Figure 7:
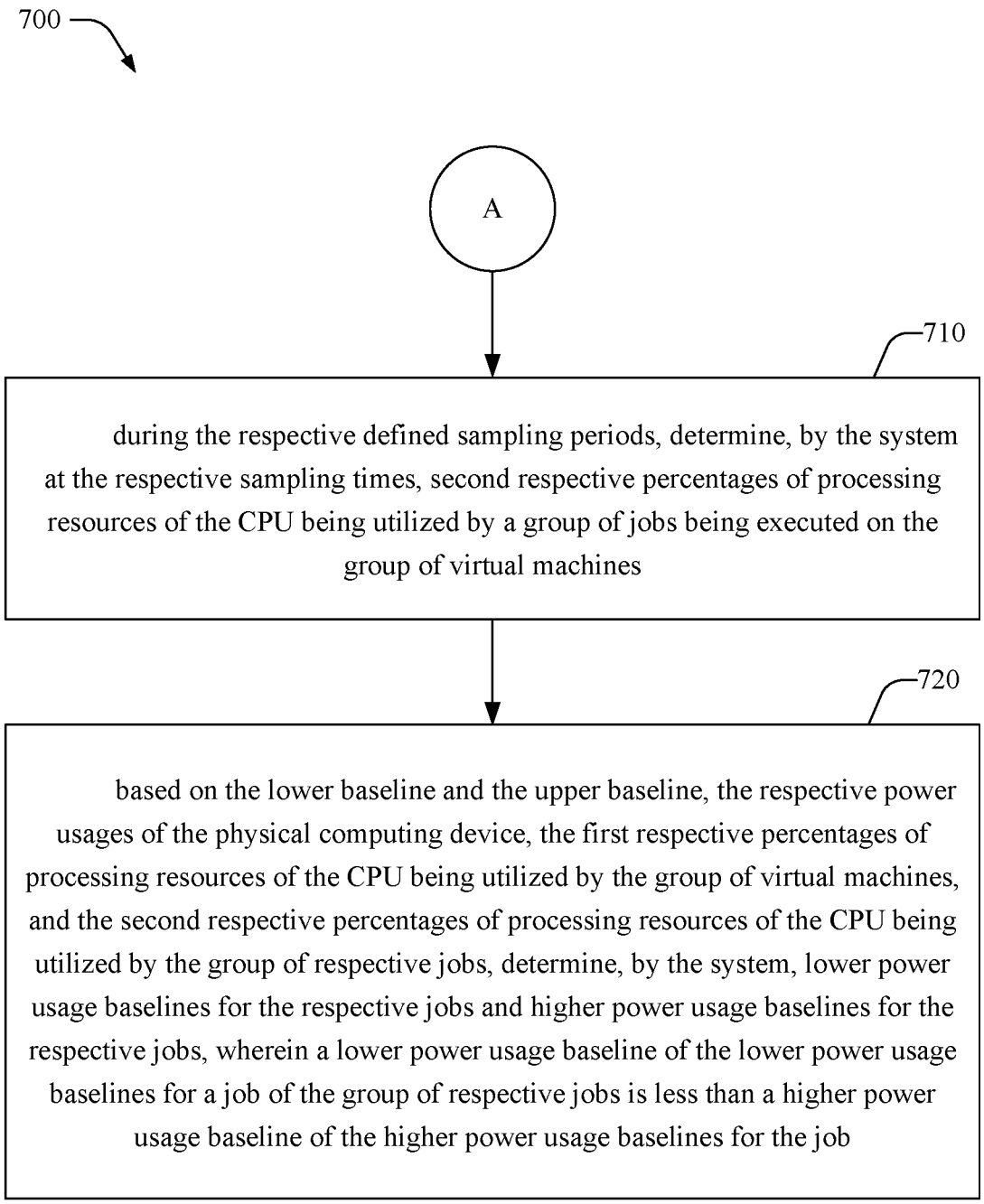

FIGS. 6-7 illustrate flow charts (600, 700) of a method associated with a system (e.g., a VM software energy use approximation system (110)), in accordance with various example embodiments. At 610, the system determines a lower baseline for power usage of a physical computing device and an upper baseline for power usage of the physical computing device, in which the lower baseline is less than the upper baseline.

At 620, during respective defined sampling periods, the system determines, at respective sampling times, respective power usages of the physical computing device.

At 630, during the respective defined sampling periods, the system determines, at the respective sampling times, first respective percentages of processing resources of a CPU of the physical computing device being utilized by a group of virtual machines being executed on the physical computing device.

At 710, during the respective defined sampling periods, the system determines, at the respective sampling times, second respective percentages of processing resources of the CPU being utilized by a group of jobs being executed on the group of virtual machines.

Figure 8:
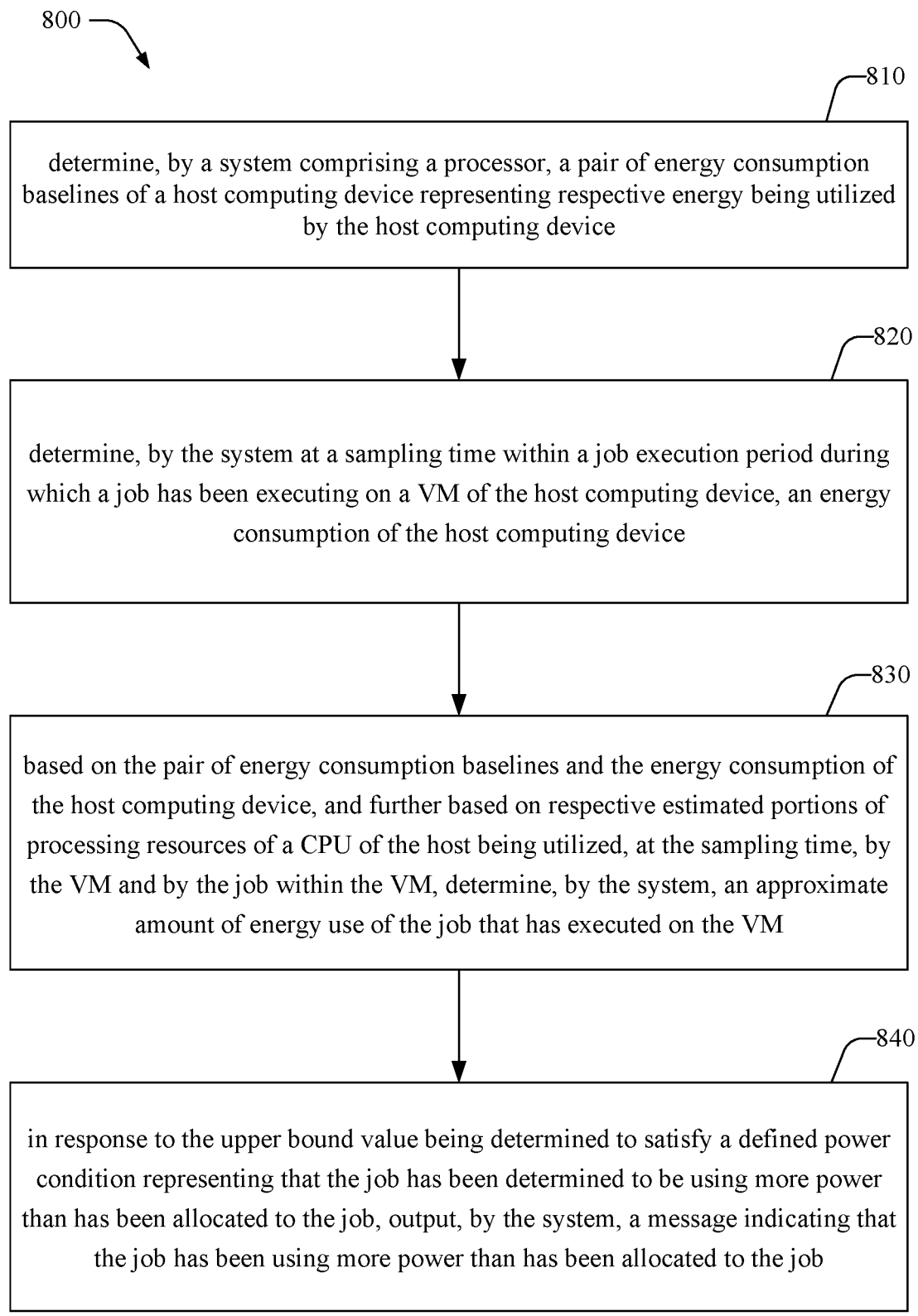
FIG. 8 illustrates a flow chart of a method associated with a VM software energy use approximation system that determines an approximate amount of energy use of a job that has executed on a VM of a host, in accordance with various example embodiments.

At 720, based on the lower baseline and the upper baseline, the respective power usages of the physical computing device, the first respective percentages of processing resources of the CPU being utilized by the group of virtual machines, and the second respective percentages of processing resources of the CPU being utilized by the group of respective jobs, the system determines lower power usage baselines for the respective jobs and higher power usage baselines for the respective jobs, in which a lower power usage baseline of the lower power usage baselines for a job of the group of respective jobs is less than a higher power usage baseline of the higher power usage baselines for the job FIG. 8 illustrates a flow chart (800) of a method associated with a system (e.g., a VM software energy use approximation system (110)) that determines an approximate amount of energy use of a job that has executed on a VM of a host, in accordance with various example embodiments. At 810, the system determines a pair of energy consumption baselines of a host computing device representing respective energy being utilized by the host computing device.

At 820, the system determines, at a sampling time within a job execution period during which a job has been executing on a VM of the host computing device, an energy consumption of the host computing device.

At 830, based on the pair of energy consumption baselines and the energy consumption of the host computing device, and further based on respective estimated portions of processing resources of a CPU of the host being utilized, at the sampling time, by the VM and by the job within the VM, the system determines an approximate amount of energy use of the job that has executed on the VM.

At 840, in response to the upper bound value being determined to satisfy a defined power condition representing that the job has been determined to be using more power than has been allocated to the job, the system outputs a message indicating that the job has been using more power than has been allocated to the job.

Figure 9:
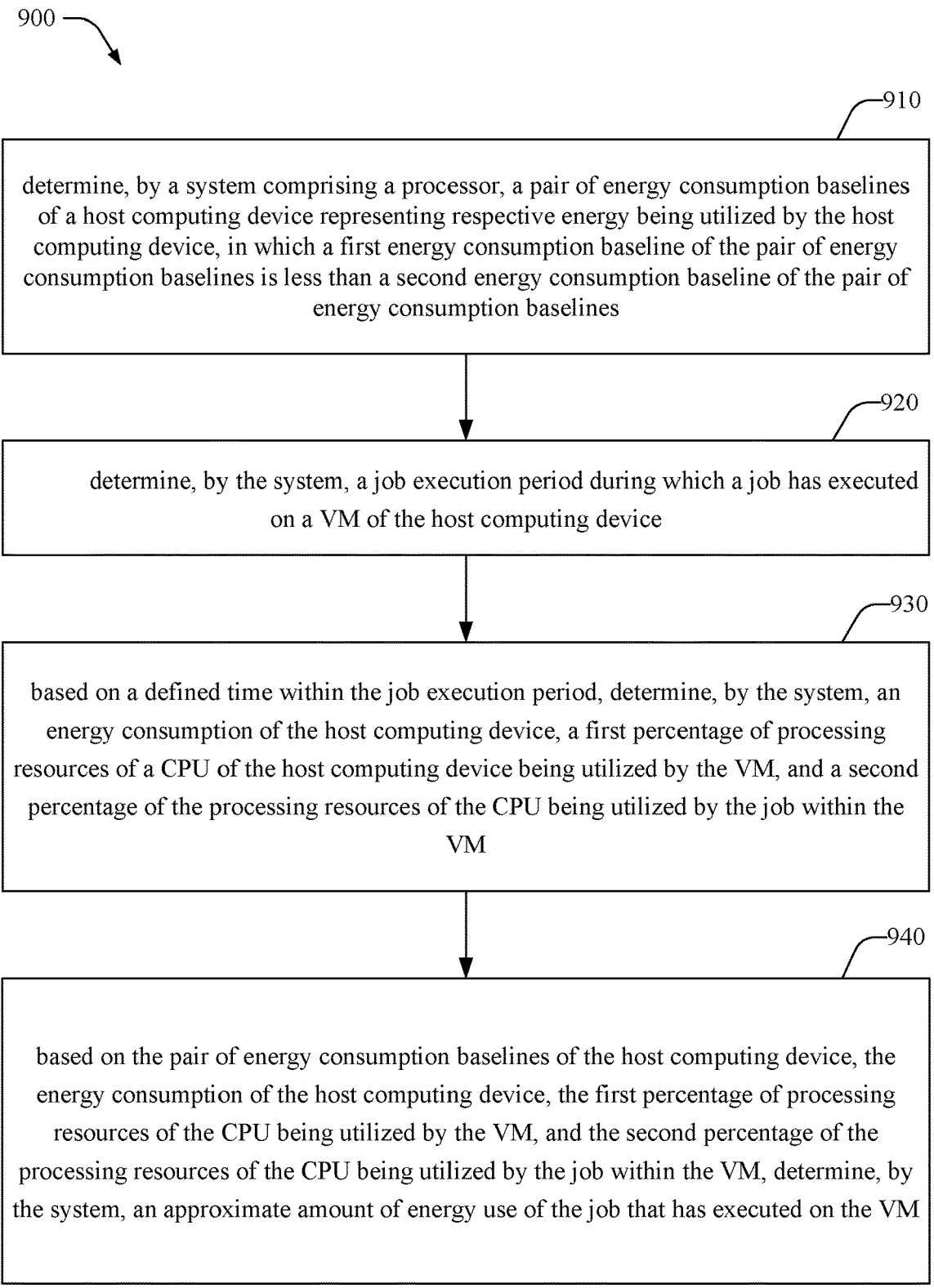
FIG. 9 illustrates a flow chart of another method associated with a VM software energy use approximation system that determines an approximate amount of energy use of a job that has executed on a VM of a host, in accordance with various example embodiments.

FIG. 9 illustrates a flow chart (900) of another method associated with a system (e.g., a VM software energy use approximation system (110)) that determines an approximate amount of energy use of a job that has executed on a VM of a host, in accordance with various example embodiments.

At 910, the system determines a pair of energy consumption baselines of a host computing device representing respective energy being utilized by the host computing device, in which a first energy consumption baseline of the pair of energy consumption baselines is less than a second energy consumption baseline of the pair of energy consumption baselines.

At 920, the system determines a job execution period during which a job has executed on a VM of the host computing device.

At 930, based on a defined time within the job execution period, the system determines an energy consumption of the host computing device, a first percentage of processing resources of a CPU of the host computing device being utilized by the VM, and a second percentage of the processing resources of the CPU being utilized by the job within the VM.

At 940, based on the pair of energy consumption baselines of the host computing device, the energy consumption of the host computing device, the first percentage of processing resources of the CPU being utilized by the VM, and the second percentage of the processing resources of the CPU being utilized by the job within the VM, the system determines an approximate amount of energy use of the job that has executed on the VM.

Reference throughout this specification to "one embodiment," "an embodiment," "another embodiment", or "yet another embodiment" means that a particular feature, structure, or characteristic described in connection with the embodiment is included in at least one embodiment. Thus, the appearances of the phrase "in one embodiment," "in an embodiment," "in another embodiment", or "in yet another embodiment" in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), middleware, and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data storage", "data store", "storage space", "data storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in memory component (240), non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1020) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
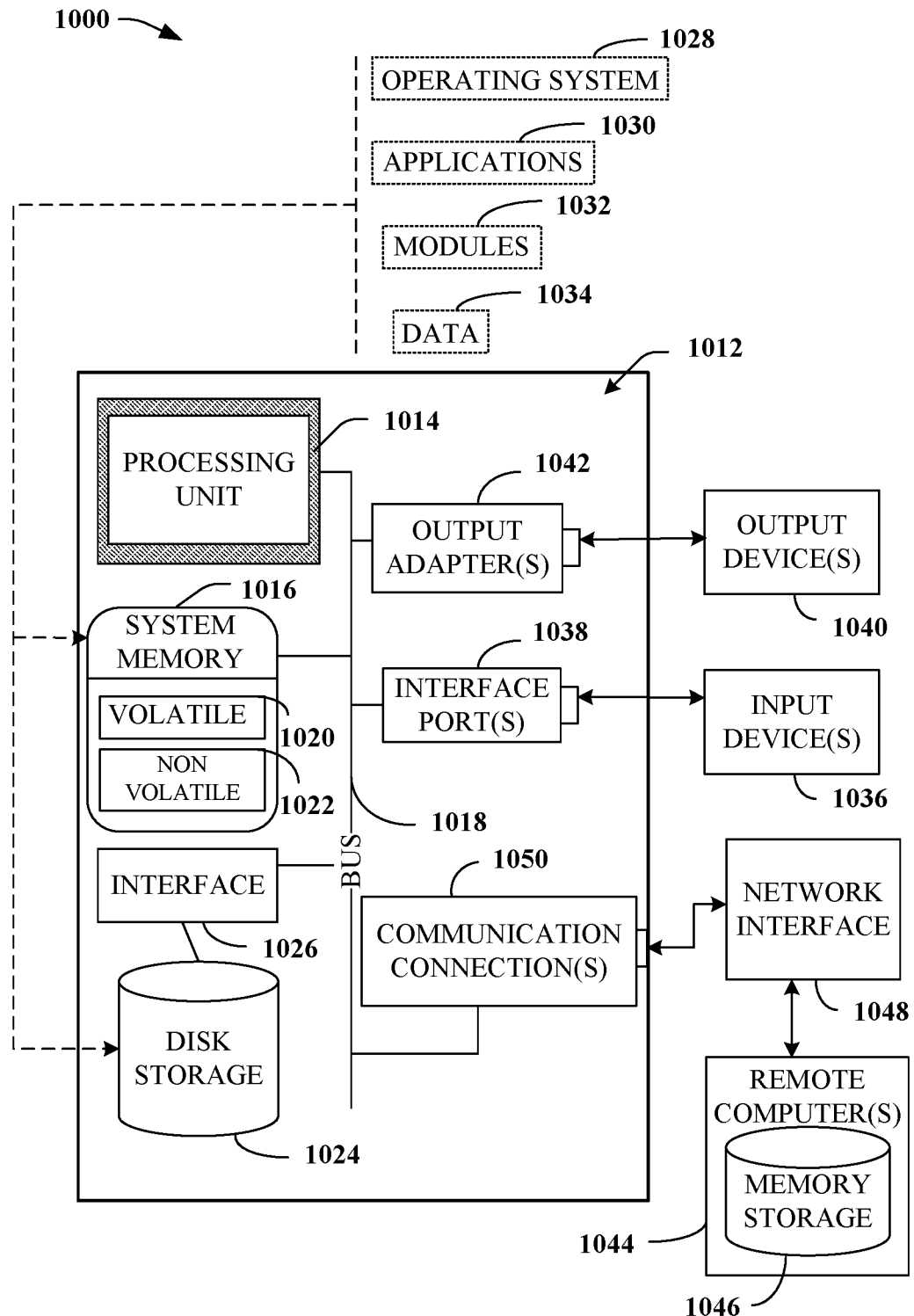
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods, e.g., via enterprise cloud computing environment (101), is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users, e.g., subscribers, and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user, e.g., subscriber, can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereof, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    at least one processor; and
    at least one memory that stores executable components that, when executed by the at least one processor, facilitate performance of operations by the system, the operations comprising:
        determining a pair of energy consumption baselines of a host computing device representing respective energy being utilized by the host computing device, wherein the host computing device comprises a hypervisor that executes a group of virtual machines comprising a virtual machine (VM);
        determining, at a sampling time within a job execution period during which a job executes within the VM, an energy consumption of the host computing device;
        determining, via the hypervisor, a group of respective estimated portions of processing resources of a central processing unit (CPU) of the host computing device being utilized, at the sampling time, by each VM of the group of virtual machines; and
        based on the pair of energy consumption baselines and the energy consumption of the host computing device, and further based on respective estimated portions of processing resources of the group of respective estimated portions of processing resources of the CPU of the host computing device being utilized, at the sampling time, by the VM and by the job within the VM, determining an approximate amount of energy use of the job that executed on the VM.

2. The system of claim 1, wherein the determining of the pair of energy consumption baselines comprises:
    based on a defined period, determining a group of energy consumption values of the host computing device;
    selecting, as a first energy consumption baseline of the pair of energy consumption baselines, a first energy consumption value of the group of energy consumption values; and
    selecting, as a second energy consumption baseline of the pair of energy consumption baselines, a second energy consumption value of the group of energy consumption values, wherein the first energy consumption baseline is less than the second energy consumption baseline.

3. The system of claim 2, wherein the first energy consumption value has been selected as the lowest energy consumption value of the group of energy consumption values.

4. The system of claim 2, wherein the first energy consumption value has been selected as an average energy consumption value of the group of energy consumption values.

5. The system of claim 2, wherein the second energy consumption value has been selected as the highest energy consumption value of the group of energy consumption values.

6. The system of claim 2, wherein the second energy consumption value has been selected as being among a defined percentage of energy consumption values of the group of energy consumption values.

7. The system of claim 1, wherein the operations further comprise:
based on a start time of the job representing a first time that the job has been initiated, and further based on an end time of the job representing a second time that the job has been completed, determining the job execution period.

8. The system of claim 7, wherein the job is represented by a function, wherein a function wrapper is implemented within the function, and wherein the determining of the job execution period comprises:
determining, via the function wrapper, the start time of the job; and
determining, via the function wrapper, the end time of the job, wherein the job execution period is equal to the start time subtracted from the end time.

9. The system of claim 8, wherein the determining of the start time comprises obtaining the start time via a first hypertext transfer protocol (HTTP) post request or a first HTTP secure (HTTPS) request, and wherein the determining of the end time comprises obtaining the end time via a second HTTP post request or a second HTTPS request.

10. The system of claim 1, wherein the determining of the approximate amount of energy use of the job that executed on the VM comprises:
based on the energy consumption of the host computing device, and further based on a first energy consumption baseline of the pair of energy consumption baselines, determining an upper bound value of the approximate amount of energy use of the job; and
based on the energy consumption of the host computing device, and further based on a second energy consumption baseline of the pair of energy consumption baselines, determining a lower bound value of the approximate amount of energy use of the job, wherein the upper bound value is greater than the lower bound value.

11. The system of claim 10, wherein the operations further comprise:
in response to the upper bound value being determined to satisfy a first defined power condition representing that the job has been determined to be using more power than has been allocated to the job, outputting a first message indicating that the job has been using more power than has been allocated to the job;
in response to the upper bound value being determined to satisfy a second defined power condition representing that the job has been determined to be using a first amount of power that is approaching, within a first defined percentage, the upper bound value, outputting a second message indicating that the job has been using the first amount of power that is approaching, the upper bound value; and
in response to the upper bound value being determined to satisfy a third defined power condition representing that the job has been determined to be using a second amount of power that is less than a second defined percentage of an expected defined power that has been allocated to the job, outputting a third message indicating that the job has been using substantially less power than has been allocated to the job.

12. The system of claim 1, wherein the group of respective estimated portions of processing resources of the CPU of the host computing device being utilized by each VM is a first group of respective estimated portions of processing resources of the CPU, wherein the group of virtual machines execute respective jobs comprising the job, and wherein the operations further comprise:
determining, via an operating system of the host computing device, a second group of respective estimated proportions of processing resources of the CPU of the host computing device being utilized, at the sampling time, by each job of the respective jobs.

13. The system of claim 12, wherein the determining of the approximate amount of energy use of the job that executed on the VM comprises:
based on the first group of respective estimated portions of processing resources of the CPU being utilized, at the sampling time, by each VM, and further based on the second group of respective estimated portions of processing resources of the CPU being utilized, at the sampling time, by each job, determining the approximate amount of energy use of the job.

14. A non-transitory machine-readable medium comprising instructions that, in response to execution, cause a system comprising at least one processor to perform operations, the operations comprising:
determining a pair of energy consumption baselines of a host computing device representing respective energy being utilized by the host computing device, wherein a first energy consumption baseline of the pair of energy consumption baselines is less than a second energy consumption baseline of the pair of energy consumption baselines, and wherein the host computing device comprises a hypervisor that executes a group of virtual machines comprising a virtual machine (VM);
determining a job execution period during which a job executes on the VM;
determining, via the hypervisor, a group of respective estimated proportions of processing resources of a central processing unit (CPU) of the host computing device being utilized, at a defined time within the job execution period, by the VM and by the job within the VM, wherein the determining of the group of respective estimated portions of processing resources of the CPU further comprises
based on the defined time within the job execution period,
determining an energy consumption of the host computing device,
determining a first percentage of processing resources of the group of respective estimated portions of processing resources of the CPU being utilized by the VM, and
determining a second percentage of the processing resources of the group of respective estimated portions of processing resources of the CPU being utilized by the job within the VM; and
based on the pair of energy consumption baselines of the host computing device, the energy consumption of the host computing device, the first percentage of processing resources being utilized by the VM, and the second percentage of the processing resources being utilized by the job within the VM, determining an approximate amount of energy use of the job that executed on the VM.

15. The non-transitory machine-readable medium of claim 14, wherein the operations further comprise:
in response to determining that the approximate amount of energy use of the job satisfies a defined condition representing that energy use of the job has approached, within a defined amount of energy use, a maximum allocated energy use, sending, via a user interface of the system, information indicating that the job has approached the maximum allocated energy use.

16. The non-transitory machine-readable medium of claim 14, wherein the determining of the pair of energy consumption baselines comprises:
based on a defined period, determining a group of energy consumption values of the host computing device;
selecting, as the first energy consumption baseline, a first energy consumption value of the group of energy consumption values; and
selecting, as the second energy consumption baseline, a second energy consumption value of the group of energy consumption values, wherein the first energy consumption baseline is less than the second energy consumption baseline.

17. The non-transitory machine-readable medium of claim 16, wherein the first energy consumption value has been selected as the lowest energy consumption value of the group of energy consumption values.

18. The non-transitory machine-readable medium of claim 16, wherein the first energy consumption value has been selected as an average energy consumption value of the group of energy consumption values.

19. The non-transitory machine-readable medium of claim 16, wherein the second energy consumption value has been selected as the highest energy consumption value of the group of energy consumption values.

20. The non-transitory machine-readable medium of claim 16, wherein the second energy consumption value has been selected as being among a defined percentage of energy consumption values of the group of energy consumption values.

* * * * *